D. GRIM.
Wheel Hub.
No. 87,926.
Patented March 16, 1869.
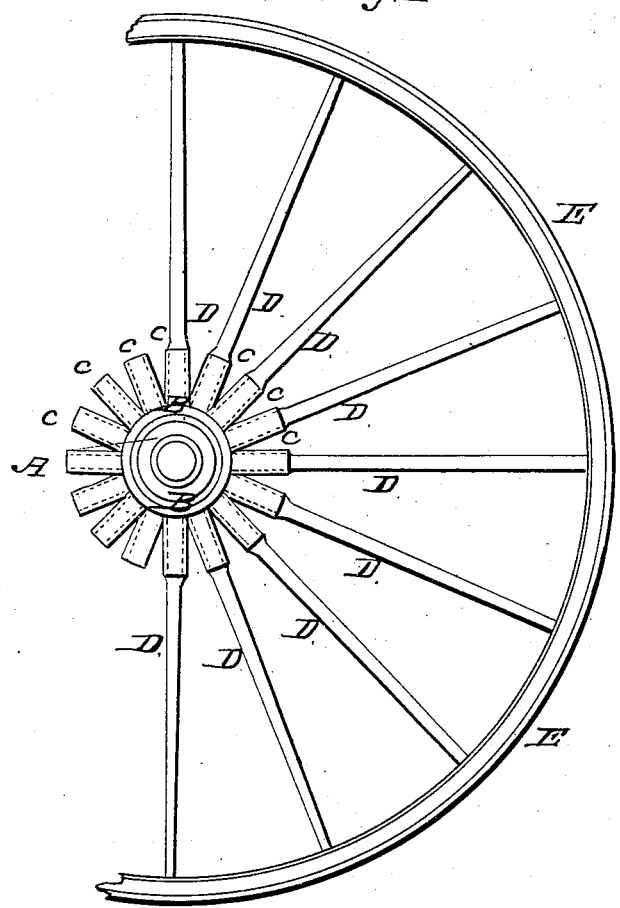
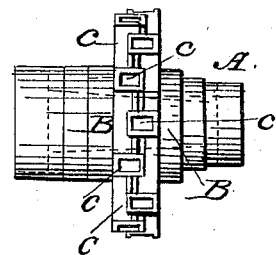

UNITED STATES PATENT OFFICE.

DAVID GRIM, OF PITTSBURG, PENNSYLVANIA.

IMPROVEMENT IN CARRIAGE-WHEELS.

*Specification forming part of Letters Patent No. 87,926, dated March 16, 1869.*

*To all whom it may concern:*

Be it known that I, DAVID GRIM, of Pittsburg, county of Allegheny, and State of Pennsylvania, have invented a new and Improved Hub for Carriage or Wagon Wheels; and I do hereby declare that the following is a full, clear, and exact description of the construction and operation of the same, reference being had to the annexed drawings, making a part of this specification, in which—

Figure 1 is a side elevation of my improved hub, showing part of the spokes and rim attached. Fig. 2 is a side view of my improved hub, showing the openings or pockets for the spokes.

A, Figs. 1 and 2, is the wooden part of my improved hub, holding the "boxes" which revolve upon the axle, and surrounded by the metal ring B. B, Figs. 1 and 2, is a projecting boss on the casting, containing the pockets C C C, &c. C, Figs. 1 and 2, are the openings or pockets in the casting, intended to hold in place the spokes or arms D. D, Fig. 1, are the arms connecting the hub at C with the rim E. E, Fig. 1, is the rim of the wheel.

To enable others skilled in the art to make and use my invention, I will proceed to describe its construction and operation.

In wagon or carriage wheels of ordinary construction, the hub is made of wood, with mortises or pockets around the rim of the hub, in which are fitted the spokes of the wheel.

There are many objections to the common wooden hub, which I propose to overcome by my improved iron or metallic hub. Among these I will mention, first, the necessity of making the hub large and cumbersome, in order to procure sufficient bearing in the hub for the spokes of the wheel; second, the constant jar on the wheel is liable to wear the spokes loose and enlarge the mortises in the hub; third, the hub, as at present constructed, is very expensive, requiring the tedious operation of carefully mortising for the reception of each spoke.

In my improved hub I take an ordinary wooden hub, in which are fitted the boxes which bear upon the axle. This wooden hub is turned off on the outside, and over it is placed, and securely held by screws or otherwise, the iron hub B, which contains the pockets C C.

This hub is made of light cast or malleable iron, and all the openings or pockets for the reception of the spokes are "dodged"—that is, so arranged upon the band B that each alternate socket C stands about half its depth in advance of the one with which it is alternated, and so constructed, with relation to each other and the hub, as that the spokes, when inserted, will be on a line at their outer ends, where they terminate in the rim of the wheel. This hub is cast entirely in one piece, and requires no fitting or bolting together.

By the use of this hub I am enabled to construct a light wheel, and at the same time give it greater strength than can possibly be secured by the present mode of construction.

The weakest part of a carriage or wagon wheel, as at present made, is where the spokes center in the hub. By the use of my improved iron hub, I make a wheel which has greatest strength where other wheels are the weakest, and at a point, too, where the greatest strength is required.

The advantages obtained by the use of my improved iron hub are, that by the use of this hub, cast entirely in one piece, I am enabled to construct wheels of less weight, at less cost of time and labor, and far more durable than those at present constructed.

What I claim as my invention, and desire to secure by Letters Patent, is—

A wooden hub, A, in combination with a metallic band, B, supporting a series of radial sockets, C, so arranged upon the band as that each alternate socket shall stand about half its depth in advance of the one with which it is alternated, and so constructed, with relation to each other and the hub, as that the spokes, when inserted, will be on a line at their outer ends, where they terminate in the rim of the wheel.

DAVID GRIM.

Witnesses:
ROBERT HARE,
H. B. SPINNEY.